United States Patent [19]
Pekar et al.

[11] Patent Number: 4,876,800
[45] Date of Patent: Oct. 31, 1989

[54] PORTABLE GRIP LENGTH INDICATOR

[75] Inventors: Gary W. Pekar; Jack W. Mason, both of Grand Prairie; Michael Blanc, Fort Worth, all of Tex.

[73] Assignee: LTV Aerospace and Defense Company, Grand Prairie, Tex.

[21] Appl. No.: 254,978

[22] Filed: Oct. 7, 1988

[51] Int. Cl.⁴ ............................ G01B 7/06; G01B 7/02
[52] U.S. Cl. ........................................ 33/784; 33/806; 364/563
[58] Field of Search ............... 33/783, 784, 806, 834, 33/836; 364/562, 563

[56] References Cited

U.S. PATENT DOCUMENTS

| | | | |
|---|---|---|---|
| 2,894,331 | 7/1959 | Stratman | 33/806 |
| 4,033,043 | 7/1977 | Cunningham | 33/806 |
| 4,172,325 | 10/1979 | Lendi et al. | 33/784 |
| 4,237,612 | 12/1980 | Christian et al. | 33/784 |
| 4,398,351 | 8/1983 | Patrick | 33/784 |
| 4,419,824 | 12/1983 | Oberhans | 33/784 |
| 4,512,083 | 4/1985 | Schmitt et al. | 33/783 |
| 4,566,199 | 1/1986 | Gruhler et al. | 33/784 |
| 4,631,831 | 12/1986 | Bacher et al. | 33/836 |
| 4,736,313 | 4/1988 | Nishimura et al. | 364/563 |
| 4,821,421 | 4/1989 | Girardier et al. | 33/784 |

Primary Examiner—William A. Cuchlinski, Jr.
Assistant Examiner—Diego F. F. Gutierrez
Attorney, Agent, or Firm—James M. Cate; William D. Jackson

[57] ABSTRACT

A portable grip length indicator for determining a discrete fastener length for a fastener to be used in fastening a stack of two or more pieces of material. The indicator comprises a body, a probe attached to the body and capable of extending beyond the body for determining the thickness of the stack, a transducer connected to the probe for sensing the relative movement of the probe and translating the movement into an electrical output signal, and an electrical processor for computing the discrete fastener length from the output signal of the transducer according to a predetermined correlation of the thickness of the stack and the type of fastener to be used.

19 Claims, 2 Drawing Sheets

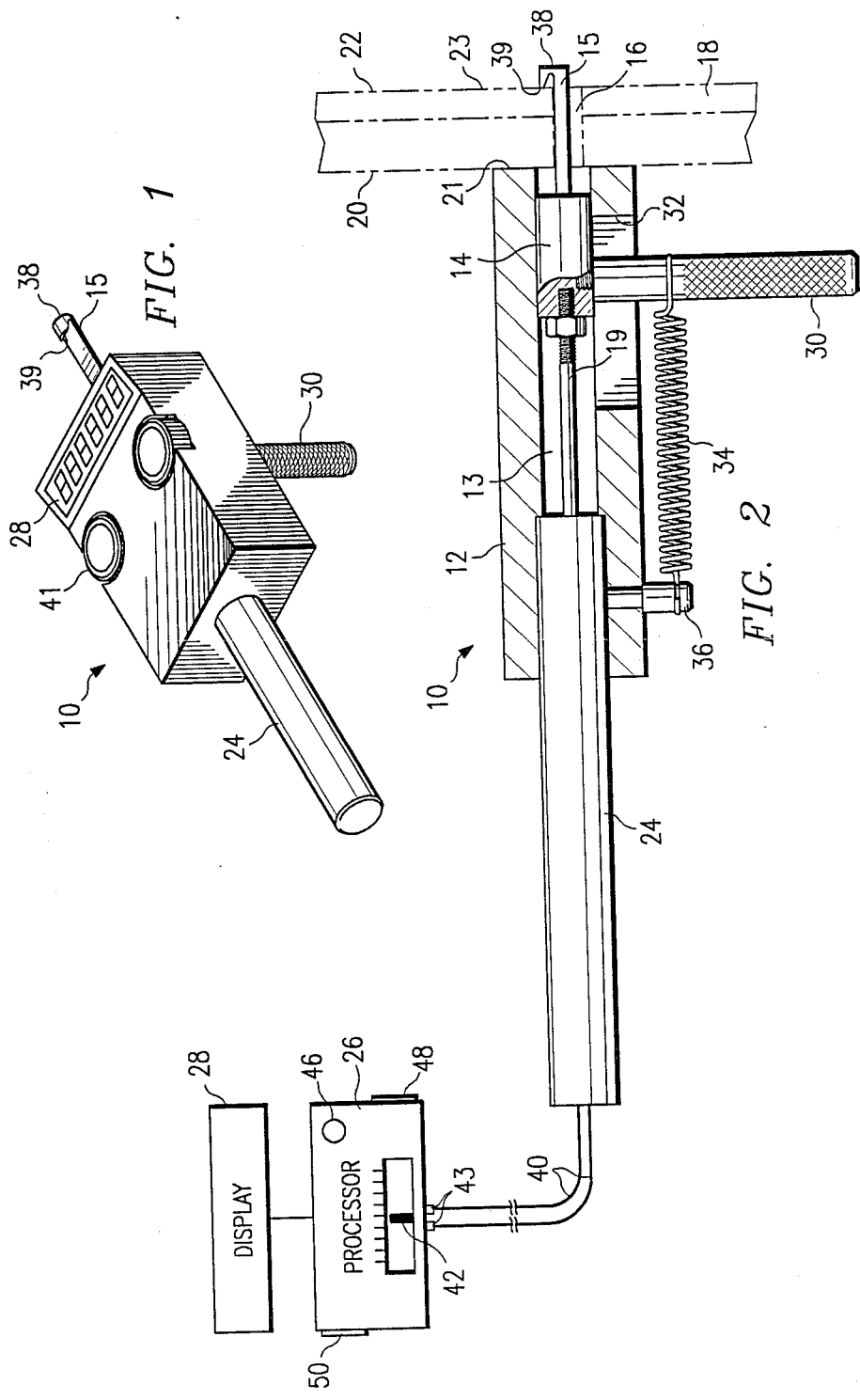

PORTABLE GRIP LENGTH INDICATOR

TECHNICAL FIELD

The invention relates to a portable grip length indicator for determining a discrete fastener length to be used in fastening the opposite faces of sheet-like material(s). More particularly, the invention is to a grip length indicator comprising a probe and linear transducer for generating an electrical signal output corresponding to the dimension measured by the probe and a processor for computing required grip length according to a predetermined correlation of the dimension between the opposite faces and the type of fastener to be used.

BACKGROUND OF THE INVENTION

The invention relates to a device useful for determining the discrete grip length of a fastener necessary for fastening together two or more pieces of material, such as sheet material. The invention is especially useful in the aircraft manufacturing or in the manufacture of other objects using rivets of different type and size in the construction.

As known in the art, many different types of fasteners are available for use. In the aircraft construction industry, one-piece rivets and two-piece fasteners such as high-lock, bimetal or huck fasteners are commonly used as well as other types of rivets, screws and bolts. The particular type, diameter and the length of fastener used in a particular connection depends upon several factors including the thickness or dimension of the stack. The diameter and type of fastener is usually selected according to the particular application and the forces, shear or tensile, to be exerted on the fastener. The length of fastener depends on the type, diameter and stack thickness.

For many types of fasteners, the manufacturer or the industry itself has developed charts correlating the stack thickness with the size and type of fastener to provide the length of fastener needed. In practice, the stack thickness is determined by manually measuring the dimension by either inserting a hand rule or gauge into the fastener hole or using a caliper, where the thickness of the pieces is accessible by caliper, and by visibly reading the dimension of the stack. The operator then consults the stack thickness chart, or other reference guide, and knowing the diameter and type of fastener to be used, obtains from the chart the discrete grip length of fastener needed for that particular hole. This procedure is time consuming and susceptible to human error in measuring the stack thickness or reading the stack thickness chart. The present invention reduces this chance of error and reduces the time required for determining the length of fastener needed by providing a device which measures the stack thickness through the hole and calculates from that measurement the discrete length of fastener needed according to the size and type of fastener selected.

SUMMARY OF THE INVENTION

The present invention provides a portable grip length indicator for determining a discrete fastener grip length for a fastener to be used in fastening the opposite faces of sheet-like material(s) or of a stack of materials having two or more pieces of material. The indicator comprises a body, probe means attached to the body and capable of extension beyond the body for determining the dimension between the opposite faces, i.e., the thickness of the stack, transducer means for sensing the movement of the probe means in relation to the body and translating the movement into an electrical signal output, and electrical processing means for processing the transducer output and computing a discrete fastener length according to a predetermined correlation of the dimension between the opposite faces and the type and diameter of fastener to be used. This correlation is maintained in the memory of the electrical processing means.

In a preferred embodiment, the probe means comprise a cylindrical probe slidable within an inner cavity of the body of the indicator. The probe means may further comprise securing means attached to the distal end of the probe means for securing the probe means in relation to the opposite faces. In a preferred embodiment, the securing means includes the distal end of the probe means being formed in a hook shape. In use, the probe means is inserted through an aperture in the stack and secured to the distant face of the opposite faces. The body of the indicator is placed up against the near face, and the transducer means senses the displacement of the probe in relation to the body and thus, the stack thickness. An electrical signal is sent to the processing means which computes the discrete fastener length according to a preselected correlation of the stack thickness and the type and diameter of fastener to be used.

In further embodiments of the invention, the indicator may include selecting means for inputting a selection of the particular type and diameter of fastener to be used. Also in a preferred embodiment, the indicator may include display means for displaying the discrete fastener length computed by the processing means. The indicator may also include positioning means attached to the probe means to provide easier manual positioning of the probe within the fastener hole. In a further embodiment, the indicator may also include spring means for biasing the probe means into a retracted position in relation to the body.

BRIEF DESCRIPTION OF THE DRAWINGS

For a more complete understanding of the present invention, and for further details and advantages thereof, reference is now made to the following Detailed Description in conjunction with the accompanying drawings, wherein like reference characters denote like parts in all views and where:

FIG. 1 is a perspective view of one embodiment of the present invention;

FIG. 2 shows a side, partial cutaway view of one embodiment of the invention with the probe inserted through a fastener aperture in a stack of materials and the probe secured to the opposite face of the stack.

DETAILED DESCRIPTION

Figure 3:
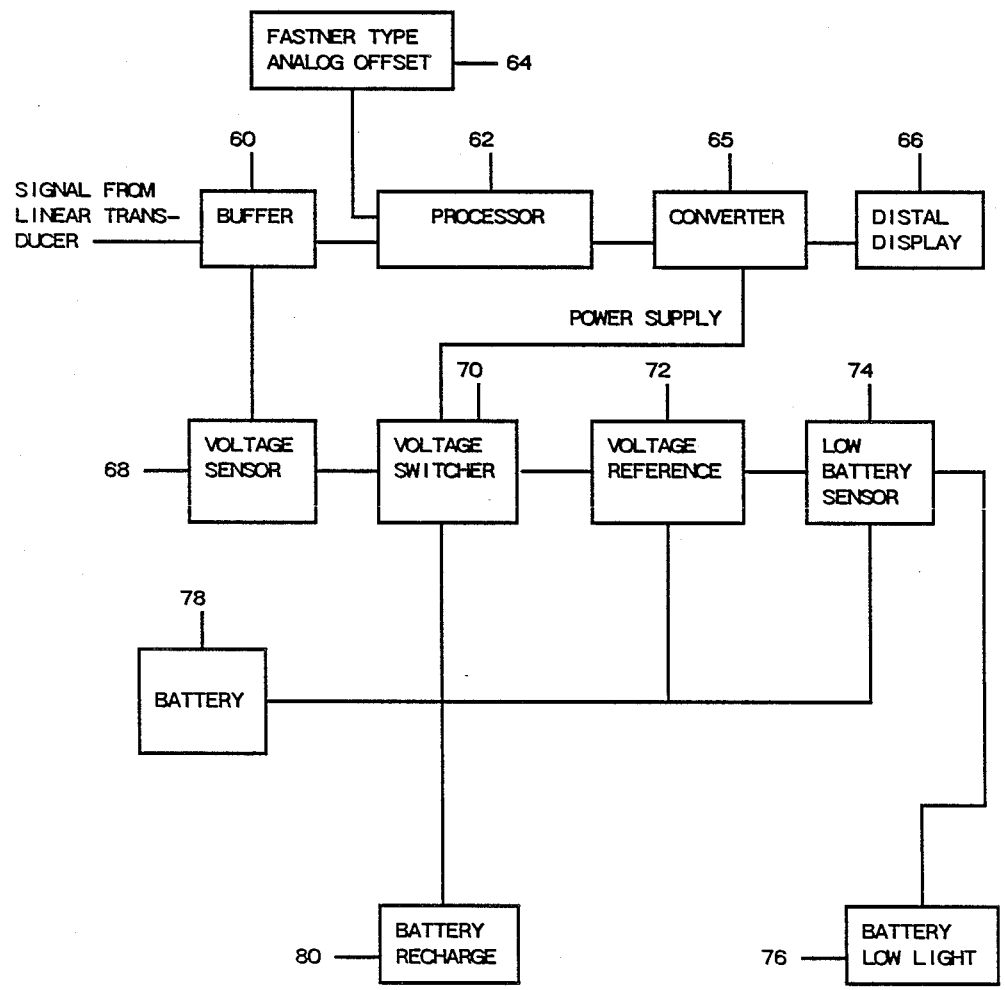
FIG. 3 shows, in block form, a schematic of the preferred electrical processing means used in the present invention.

The portable grip length indicator of the present invention provides a portable device used for determining the appropriate fastener length for a particular fastener hole. The indicator may be adapted to compute a fastener length for various types and sizes of fasteners. This type of variability allows the indicator of the present invention to be very useful in industries such as aircraft manufacturing that utilize different types and sizes of fasteners throughout the construction. The types of materials to be fastened may vary but generally are sheets of materials, or sheetlike material(s), and may be of any shape, configuration or construction. The only requirement of the materials to be fastened is that they have opposite faces, a near and distant face, which the fastener will act on to hold the piece(s) of material together.

The portable grip length indicator of the present invention comprises a body or housing and probe means attached to said body and capable of extension beyond the body for determining the dimension between two opposite faces, i.e., the stack thickness. The indicator further comprises transducer means for sensing the movement of the probe means in relation to the body and translating the movement into an electrical signal output. The indicator further comprises electrical processing mean for processing the transducer signal and computing a discrete fastener length according to a predetermined correlation of the dimension between the opposite faces and the type of fastener to be used. Currently, such information is typically provided by the fastener manufacturers or is taken from other references known in the art such as stack thickness charts.

The body, probe means and transducer means are preferably of such a size as to be hand-held and easily manipulated by the operator. The electrical processing means may be contained in a remote location from the body, probe means and transducer means, and be connected by wires with the transducer means. The processing means may also be built into the body to form an integral unit. In a further embodiment, display means may be included to display the computed fastener length. The display means may be packaged together with the processing means in a hand-held or portable unit or it may be a separate unit by itself.

Referring now to FIGS. 1 and 2, a preferred embodiment of the invention is shown as indicator 10. As shown, indicator 10 comprises a housing 12, having an inner cavity 13, with a probe 14 contained within cavity 13. Probe 14 also has a member 15 which is capable of extending beyond cavity 13 and is positionable through a hole 16 in a stack 18. Stack 18 consists of two pieces of material 20 and 22 to be joined by a fastener inserted through hole 16. In use, housing 12 is positionable against the near face 21 of piece 20 and member 15 is extended through hole 16 in stack 18. Member 15 is secured in relation to piece 22 by a hook-shaped end 38 contacting face 23 of piece 22. A linear transducer 24 is connected to probe 14 by rod 19. Linear transducer 24 senses the relative movement of probe 14 and translates the relative movement into an electrical output signal. The signal is output via lines 40 and is received by processor 26 which computes a discrete fastener length according to a predetermined correlation of the dimension between faces 21 and 23, the thickness of stack 18, and the type and size of fastener to be used. This correlation between the thickness of the stack and the type of fastener is stored in the memory of the processor 26 such that when the type of fastener is selected, processor 26 retrieves the correlation from memory and uses the thickness to calculate the required fastener length. The type and size of fastener may be selected and input into the processor 26 by use of selector 42. The discrete fastener length computed by the processor 26 is outputted by display 28.

Also, in a preferred embodiment, a positioning rod 30 is attached to probe 14 through an opening 32 in the housing 12. Rod 30 allows for manual positioning of probe 14 within cavity 13 and thus the positioning of member 15 beyond cavity 13. Attached to rod 30, is spring 34 that biases rod 30 and probe 14 toward a retracted position within cavity 13. Spring 34 is connected to the body 12 via peg 36. The biasing of spring 34 maintains probe 14 in a retracted position when indicator 10 is not in use.

As shown in FIG. 1, processor 26 and display 28 are coupled within a portable control device that is hand-held or attached to the clothing of the operator. This control device includes selector 42, an on-off switch 41 and appropriate jacks 43 for receiving lines 40. In such a portable unit, the power is supplied by a battery held within the control device. The control device further includes such convenience features as a battery low light indicator 46 and jack 48 for charging the battery. Further, the system may be provided with a power switch 50 that functions with linear transducer 24 such that the main power unit is not switched on until the transducer is activated by the movement of probe 14 relative to transducer 24 using rod 30. Return of the probe to its retracted position shuts off the main power for indicator 10. In addition, the indicator is provided with a diagnostic system to check the charge of the battery and illuminate the battery low light indicator 46 when the battery needs replacing or recharging.

In a preferred embodiment, the processing means consists of the electronics needed to receive the signal from the transducer, convert the signal into binary, compute the discrete grip length of the type of fastener selected, and change the output to decimal to be displayed. The selection of the type of fastener to be used is inputted through the selector 42 and received by the processor 26. In an alternative embodiment, the unit may be dedicated to a specific type and size of fastener. The selection of the type of fastener includes not only the selection of a rivet, bolt, etc., but may also include the specific type of rivet or bolt and, where necessary, the diameter or size of fastener. Processor 26 is programmed with the information necessary to correlate the type of fastener and the stack thickness to compute the discrete fastener length that is required. This information correlates to that taken from charts used currently in industry or as is known in the art.

A preferred schematic for the processing means is shown in FIG. 3. A signal is received from the linear transducer, is held in buffer 60 and is sent to processor 62. Processor 62 also receives the selection of the type of fastener to be used, including the diameter if appropriate, from analog offset 64. Processor 62 then computes the grip length according to the formula:

$$\text{grip length} = \text{Stack thickness} + \text{protrusion constant}$$
$$\text{as measured by}$$
$$\text{the probe}$$

For ordinary rivets, the protrusion constant is proportional to the diameter of the rivet and may be calculated as:

$$\text{protrusion constant} = k(\text{diameter of rivet})$$

Either the protrusion constant or the constant k is usually supplied by the manufacturer of the rivet. The k values are generally within the range 0.14–0.175 for CV 4, 6, 8, and 10 type rivets.

For other types of fasteners such as the high-lock, bimetal or huck, the protrusion constant is not proportional to the diameter and is simply a constant provided by the manufacturer. The protrusion constants for both the rivets and other fasteners are programmed into processor 62 and are available for recall when the fastener type is selected. For ordinary rivets, the selected fastener diameter would also need to be input into the processor. The processor receives the selection, recalls the appropriate information, makes the computation and outputs a discrete fastener length that is converted from binary to decimal by converter 65 and displayed by display 66.

FIG. 3 further shows the power and diagnostic systems schematic for a preferred embodiment of the invention. These systems include voltage sensor 68, voltage switcher 70, voltage reference 72, low battery sensor 74, low battery light 76, battery 78 and battery recharge circuit 80 as indicated.

The grip length indicator of the present invention provides an accurate means of determining the discrete length of fastener needed for a particular connection. Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit and scope of the invention. Accordingly, the present invention is intended to encompass such rearrangements, modifications, and substitutions of parts and elements as fall within the spirit and scope of the present invention.

We claim:

1. A portable grip length indicator for determining a discrete fastener length for a fastener to be used in fastening the opposite faces of sheet-like material(s), said indicator comprising:
   a body;
   probe means connected to said body and capable of extension beyond said body for determining the dimension between the opposite faces, said probe means having a distal end that is extendible beyond the body;
   transducer means connected to said probe means for sensing the relative movement of the probe means and translating said movement into an electrical output signal; and
   electrical processing means for processing the output signal from the transducer means and computing a discrete fastener length according to a predetermined correlation of the dimension between the opposite faces and the type of fastener to be used, said electrical processing means including means for storing information concerning the type of fastener used said correlation being stored and maintained in memory by said processing means.

2. The grip length indicator of claim 1, wherein the body has an inner cavity in which the probe means is slidably engaged.

3. The grip length indicator of claim 2, wherein the probe means is positionable through an aperture in the opposite faces.

4. The grip length indicator of claim 1, further comprising securing means attached to the distal end of said probe means for securing the probe means in relation to the opposite faces.

5. The grip length indicator of claim 1 wherein said electrical processing means includes means for storing information concerning a plurality of fasteners, and further comprising selecting means for inputting a selection of the particular type of fastener to be used.

6. The grip length indicator of claim 5, wherein said electrical processing means receives the selection of the particular type of fastener to be used and determines the discrete fastener length according to a preselected correlation of the dimension between the opposite faces and the selection of the type of fastener.

7. The grip length indicator of claim 1, further comprising display means for displaying the discrete fastener length computed by the processing means.

8. The grip length indicator of claim 1, further comprising positioning means attached to said probe means for manually positioning the probe means in relation to the body.

9. The grip length indicator of claim 1, further comprising spring means for biasing said probe means to a retracted position in relation to the body.

10. A portable grip length indicator for determining a discrete fastener length for a fastener to be used in fastening a stack of materials consisting of two or more pieces of material, the stack having a near face and a distal face, and said indicator comprising:
    a body positionable against the near face of the stack;
    probe means connected to said body, movable in relation to said body, and capable of extension beyond said body for determining the thickness of the stack, and said probe means having a distal end that is extendible beyond the body;
    transducer means connected to said probe means for sensing the relative movement of the probe means and translating said movement into an electrical signal;
    securing means attached to said probe means for securing the probe means to the distal face of the stack;
    electrical processing means for processing the output signal from the transducer means and computing a discrete fastener length according to a predetermined correlation between the thickness of the stack and the type of fastener to be used, said electrical processing means including means for storing information concerning the type of fastener used, said correlation being maintained in memory by said processing means; and
    display means for displaying the fastener length computed by the processing means.

11. The grip length indicator of claim 10, wherein said body has an inner cavity in which said probe means is slidably engaged.

12. The grip length indicator of claim 10 further comprising selecting means for inputting a selection of a particular type of fastener to be used, and the electrical processing means receiving the input from the selecting means and computing a discrete fastener length according to a predetermined correlation between the type of fastener selected and the thickness of the stack.

13. The grip length indicator of claim 10, wherein said probe means is positionable through an aperture in the stack.

14. The grip length indicator of claim 10, further comprising positioning means attached to said probe means for manually positioning the probe means in relation to the body.

15. The grip length indicator of claim 10, further comprising spring means for biasing the probe means toward a retracted position in relation to the body.

16. The grip length indicator of claim 10, wherein said securing means comprises the distal end of said probe means being formed in a hook-shape.

17. A portable grip length indicator for determining a discrete fastener length to be used in fastening a stack of two or more pieces of material, the stack having a near face and a distal face, and said indicator comprising:
- a body having an inner cavity, and said body being positionable against the near face of the stack;
- a probe slidably engaged within said cavity, and having a distal end extendable beyond said body and positionable through an aperture in the stack to measure the thickness of the stack;
- securing means attached to the distal end of the probe for securing the probe in relation to the distal face of the stack;
- a linear transducer connected to the probe for measuring the displacement of the probe within the cavity and translating the measurement into an electrical output signal;
- selecting means for inputting a selection of the type of fastener to be used;
- electrical processing means for processing the output signal from the transducer and the selection of the type of fastener and computing a discrete fastener length according to a predetermined correlation between the thickness of the stack and the type of fastener selected, the correlation being maintained as memory by the electrical processing means;
- positioning means attached to the probe for positioning the probe in relation to the body; and
- display means for displaying the discrete fastener length computed by the processing means.

18. The grip length indicator of claim 17, wherein said securing means comprises the distal end of said probe being formed in a hook-shape.

19. The grip length indicator of claim 17, further comprising spring means for biasing the probe into a retracted position within the body cavity.

* * * * *